(12) United States Patent  
Aho et al.

(10) Patent No.: US 9,229,782 B2  
(45) Date of Patent: Jan. 5, 2016

(54) COLLECTIVELY LOADING AN APPLICATION IN A PARALLEL COMPUTER

(75) Inventors: Michael E. Aho, Rochester, MN (US); John E. Attinella, Rochester, MN (US); Thomas M. Gooding, Rochester, MN (US); Samuel J. Miller, Rochester, MN (US); Michael B. Mundy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 13/431,248

(22) Filed: Mar. 27, 2012

(65) Prior Publication Data

US 2013/0263138 A1    Oct. 3, 2013

(51) Int. Cl.  
*G06F 9/46* (2006.01)  
*G06F 9/50* (2006.01)

(52) U.S. Cl.  
CPC ........ *G06F 9/5072* (2013.01); *G06F 2209/549* (2013.01)

(58) Field of Classification Search  
None  
See application file for complete search history.

(56) References Cited

U.S. PATENT DOCUMENTS

| 8,296,419 | B1* | 10/2012 | Khanna et al. | 709/224 |
| 2005/0144298 | A1* | 6/2005 | Samuel et al. | 709/230 |
| 2006/0080389 | A1* | 4/2006 | Powers et al. | 709/203 |
| 2008/0059555 | A1* | 3/2008 | Archer et al. | 709/201 |
| 2009/0300624 | A1* | 12/2009 | Branson et al. | 718/102 |

OTHER PUBLICATIONS

Tool Interface Standards Committee (TIS), "Executable and Linkable Format (ELF)", from Tool Interface Standard (TIS) Portable Formats Specification, Oct. 1993, pp. 5-62, Version 1.1, Intel Corporation, Prospect, IL, Intel Order No. 241597.

\* cited by examiner

*Primary Examiner* — Dong Kim  
(74) *Attorney, Agent, or Firm* — Edward J. Lenart; Grant A. Johnson; Kennedy Lenart Spraggins LLP

(57) ABSTRACT

Collectively loading an application in a parallel computer, the parallel computer comprising a plurality of compute nodes, including: identifying, by a parallel computer control system, a subset of compute nodes in the parallel computer to execute a job; selecting, by the parallel computer control system, one of the subset of compute nodes in the parallel computer as a job leader compute node; retrieving, by the job leader compute node from computer memory, an application for executing the job; and broadcasting, by the job leader to the subset of compute nodes in the parallel computer, the application for executing the job.

15 Claims, 8 Drawing Sheets

US 9,229,782 B2

COLLECTIVELY LOADING AN APPLICATION IN A PARALLEL COMPUTER

STATEMENT REGARDING FEDERALLY SPONSORED RESEARCH OR DEVELOPMENT

This invention was made with Government support under Contract No. B579040 awarded by the Department of Energy. The Government has certain rights in this invention.

BACKGROUND OF THE INVENTION

1. Field of the Invention

The field of the invention is data processing, or, more specifically, methods, apparatus, and products for collectively loading an application in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can be massively parallel and comprised of many processing blocks. A particular computational task may be executed in parallel across many of these processing blocks. In order to participate in the execution of the particular computational task, each processing block may require the same execution environment, including the same software for carrying out the computational task and the same execution parameters. If each processing block reads the software and execution parameters for carrying out the computational task from a file system, the number of accesses to the file system grows as the number of processing blocks grows.

SUMMARY OF THE INVENTION

Methods, apparatus, and products for collectively loading an application in a parallel computer, the parallel computer comprising a plurality of compute nodes, including: identifying, by a parallel computer control system, a subset of compute nodes in the parallel computer to execute a job; selecting, by the parallel computer control system, one of the subset of compute nodes in the parallel computer as a job leader compute node; retrieving, by the job leader compute node from computer memory, an application for executing the job; and broadcasting, by the job leader to the subset of compute nodes in the parallel computer, the application for executing the job.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
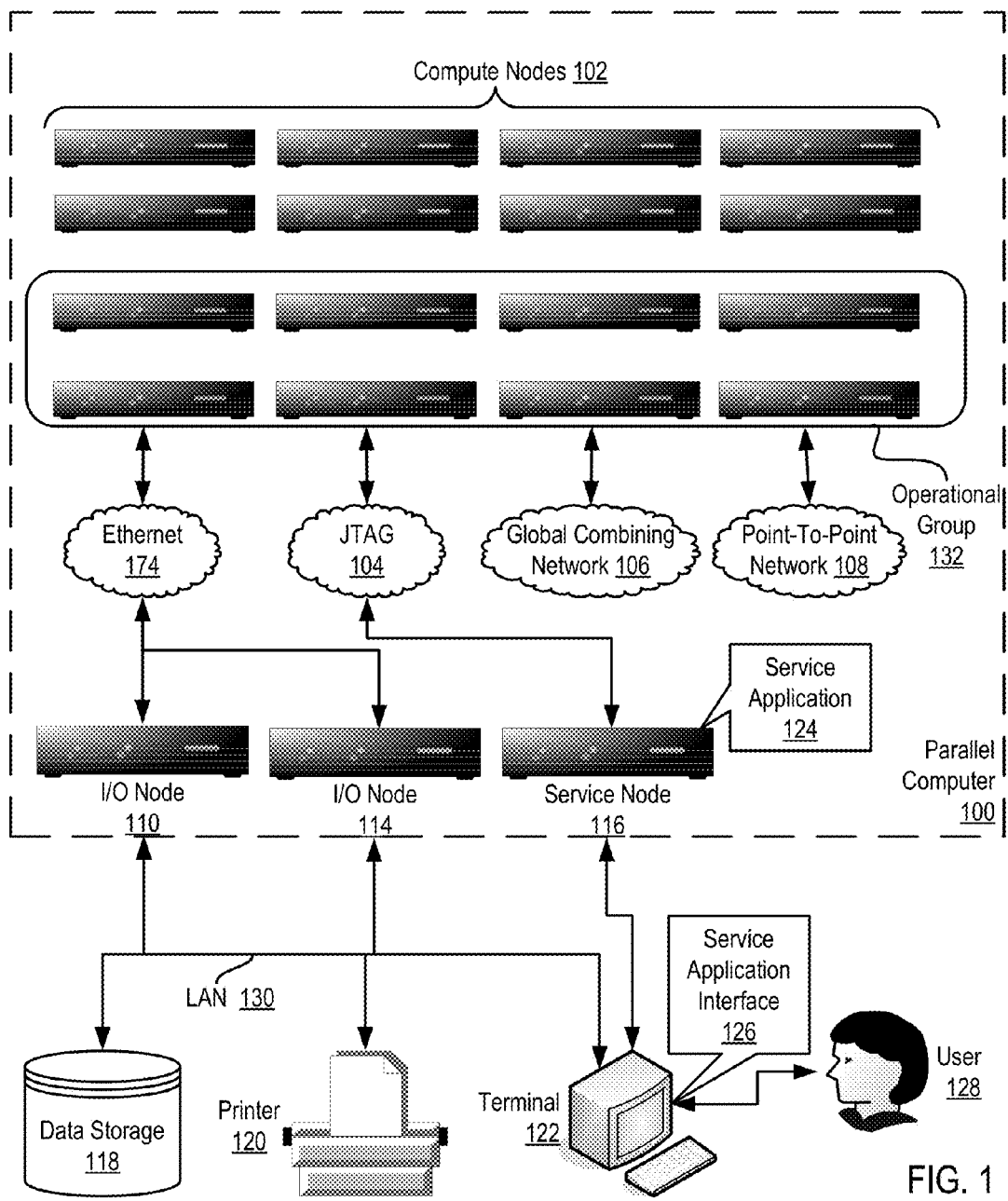
FIG. 1 illustrates an example system for collectively loading an application in a parallel computer according to embodiments of the present invention.

Example methods, apparatus, and products for collectively loading an application in a parallel computer in accordance with the present invention are described with reference to the accompanying drawings, beginning with FIG. 1. FIG. 1 illustrates an example system for collectively loading an application in a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

| MPI_MAX | maximum |
|---|---|
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for collectively loading an application in a parallel computer according to embodiments of the present invention. In the example of FIG. 1, the parallel computer (100) represents an example of a computing system in which an application may be collectively loaded.

The parallel computer (100) of FIG. 1 can collectively load an application in a parallel computer (100) by identifying, by a parallel computer control system, a subset of compute nodes in the parallel computer (100) to execute a data processing job. The parallel computer control system of FIG. 1 may be embodied, for example, as a module of computer program instructions configured to manage the execution of data processing jobs in a parallel computer (100). The parallel computer control system of FIG. 1 may be configured to assign data processing jobs to one or more compute nodes in the parallel computer (100), send configuration information to the compute nodes in the parallel computer (100) that are assigned to execute the data processing job, receive results from the compute nodes in the parallel computer (100) that are assigned to execute a data processing job, and so on. In the example of FIG. 1, identifying a subset of compute nodes in the parallel computer (100) to execute the data processing job may be carried out, for example, by identifying compute nodes in the parallel computer (100) that are underutilized, by identifying the least utilized compute nodes in the parallel computer (100), by determining the number of compute nodes needed to execute a data processing job, by identifying compute nodes with the requisite types of computer resources needed to execute a data processing job, and so on.

The parallel computer (100) of FIG. 1 can further collectively load an application in a parallel computer (100) by selecting, by the parallel computer control system, one compute node in the subset of compute nodes in the parallel computer as a job leader compute node. In the example of FIG. 1, the job leader compute node that is part of the subset of compute nodes in the parallel computer (100) that has been assigned to execute the data processing job. The job leader compute node operates somewhat differently than the other compute nodes in the selected subset of compute nodes as the job leader compute node is responsible for carrying out administrative aspects of executing the data processing job. For example, the job leader compute node may be responsible for retrieving a job processing software application from memory in the parallel computer (100), sending the job processing software application other compute nodes in the selected subset of compute nodes, sending necessary configuration information to the compute nodes in the selected subset of compute nodes, and so on.

In the example of FIG. 1, selecting one compute node in the subset of compute nodes in the parallel computer as a job leader compute node may be carried out in many ways as will occur to those of skill in the art. For example, selecting one compute node in the subset of compute nodes in the parallel computer as a job leader compute node may be carried out by randomly selecting one compute node in the subset of compute nodes in the parallel computer (100) as a job leader compute node, by using a selection algorithm that selects a compute node that has most recently been selected as a job leader compute node, by using a selection algorithm that selects a compute node that has least recently been selected as a job leader compute node, and so on. In addition, selecting one compute node in the subset of compute nodes in the parallel computer (100) as a job leader compute node may be carried out by identifying the compute node in the subset of compute nodes in the parallel computer (100) that has the highest amount of available network bandwidth, by identifying a compute node that has the fewest number of average network hops between itself and the other compute nodes in the subset of compute nodes in the parallel computer (100), and so on.

The parallel computer (100) of FIG. 1 can further collectively load an application in a parallel computer (100) by retrieving, by the job leader compute node from computer memory in the parallel computer (100), an application for executing the data processing job. In the example of FIG. 1, the application may be embodied as a special purpose module of computer program instructions for carrying out a specific task. Consider an example in which the data processing job is an instruction to sort entries in a database. In such an example, the application may be embodied as a sorting algorithm that inspects the contents of a database and sorts entries in the database using a designated field in each database entry. The application for executing the data processing job may be embodied, for example, as a file that includes computer program instructions that, when installed on a particular compute node, enables the compute node to sort entries in a database.

In the example of FIG. 1, retrieving, by the job leader compute node from computer memory of the parallel computer (100), an application for executing the data processing job may be carried out by issuing an instruction to read a location in computer memory at which the application is stored. Readers will appreciate that because the job leader compute node is the only compute node in the subset of compute nodes that performs a read operation from computer memory, the computer memory will not be overburdened with read requests. Consider an example in which the subset of compute nodes consisted of tens of thousands of compute nodes. In such an example, if each compute node in the subset of compute nodes were to individually attempt to acquire the application, the computer memory and corresponding memory controllers would need to service tens of thousands of read requests. In embodiments of the present invention, however, the computer memory and corresponding memory controllers only need to service one read request, which is issued by the job leader compute node.

The parallel computer (100) of FIG. 1 can further collectively load an application in a parallel computer (100) by broadcasting, by the job leader compute node to the subset of compute nodes in the parallel computer (100), the application for executing the data processing job. Broadcasting the application for executing the data processing job may be carried out, for example, through the use of a collective broadcast operation as described below with reference to FIGS. 1-5. In such an example, the job leader compute node may broadcast the application to other compute nodes in the subset of compute nodes and wait for a response from each compute node indicating that the application was received. Readers will appreciate that the job leader compute node may even write the application directly into computer memory on a particular compute node through the use of a direct put operation.

Collectively loading an application in a parallel computer is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters.

Figure 2:
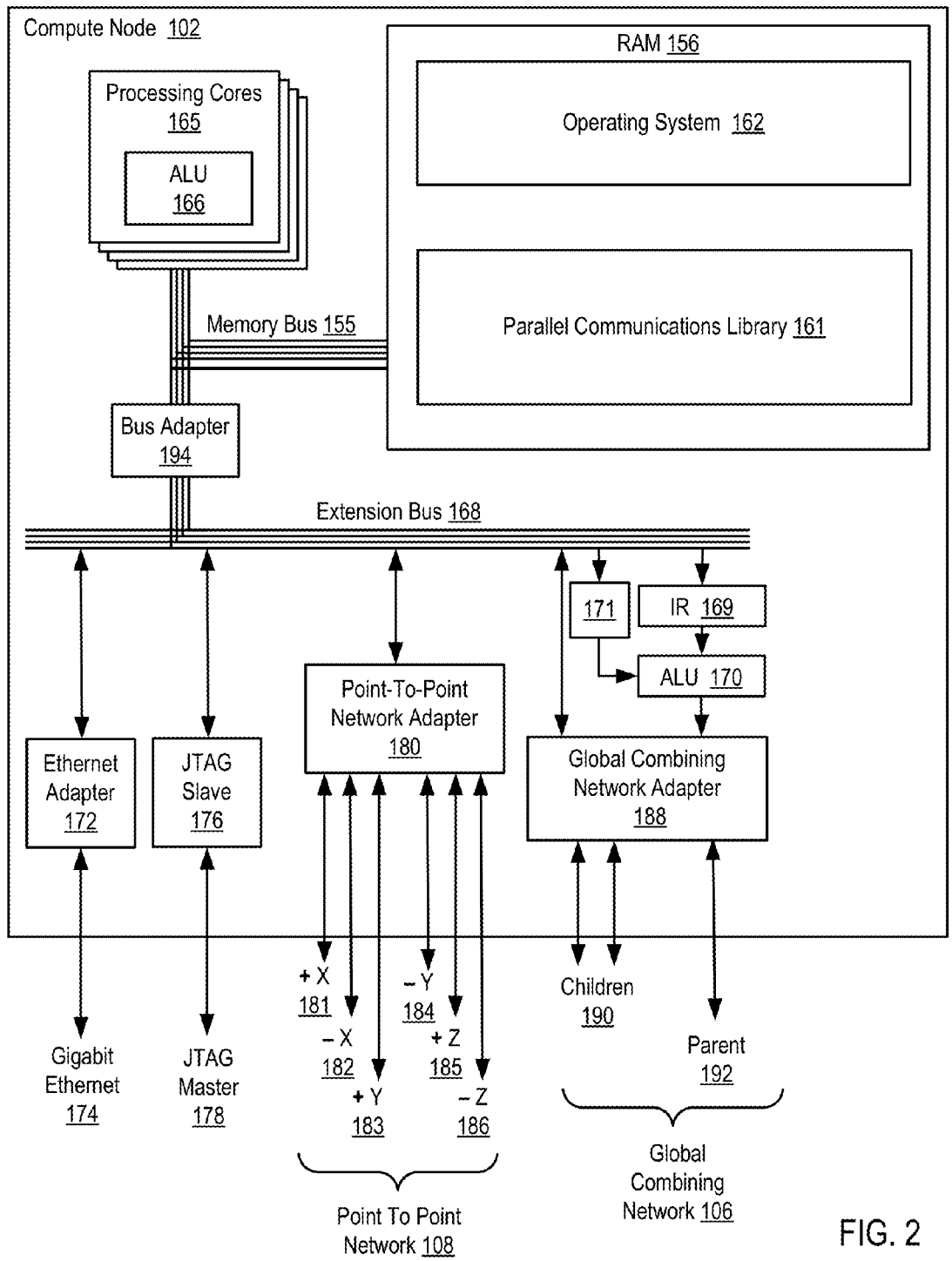
FIG. 2 sets forth a block diagram of an example compute node useful in a parallel computer capable of collectively loading an application in a parallel computer according to embodiments of the present invention.

For further explanation, FIG. 2 sets forth a block diagram of an example compute node (102) useful in a parallel computer capable of collectively loading an application in a parallel computer according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an application (226). The application (226) in the example of FIG. 2 may be configured as one instance of a parallel application with other instances executing amongst a plurality of compute nodes organized into an operational group. The application (226) in the example of FIG. 2 is configured for collectively loading an application in a parallel computer in accordance with embodiments of the present invention. The application (226) in the example of FIG. 2 can calculate a checksum with inactive networking components in accordance with embodiments of the present invention by carrying out the steps of: identifying, by a parallel computer control system, a subset of compute nodes in the parallel computer to execute a job; selecting, by the parallel computer control system, one of the subset of compute nodes in the parallel computer as a job leader compute node; retrieving, by the job leader compute node from computer memory, an application for executing the job; and broadcasting, by the job leader to the subset of compute nodes in the parallel computer, the application for executing the job.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus capable of configuring compute nodes in a parallel computer using RDMA include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems capable of collectively loading an application in a parallel computer according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Figure 3A:
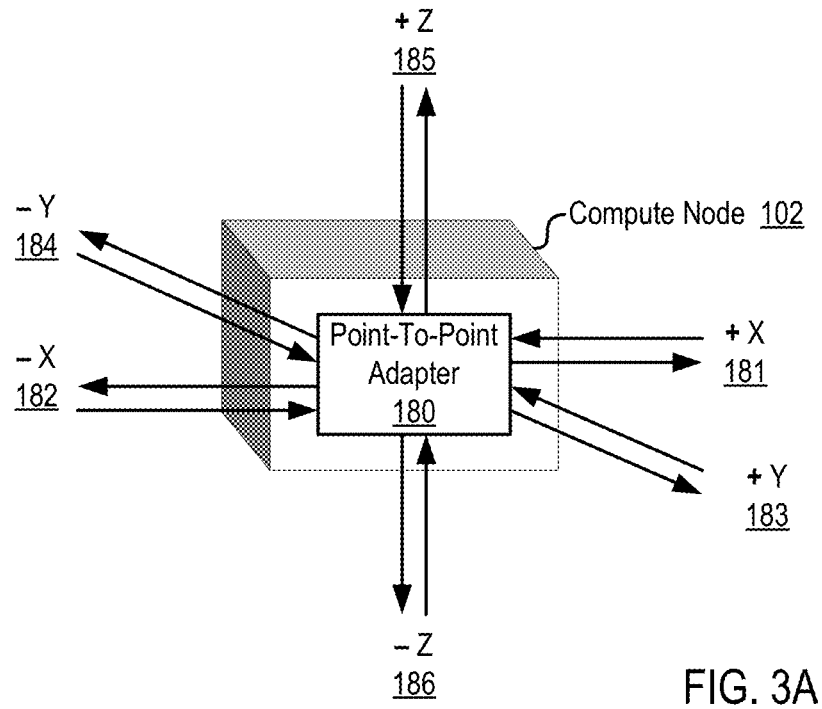
FIG. 3A sets forth a block diagram of an example Point-To-Point Adapter useful in systems capable of collectively loading an application in a parallel computer according to embodiments of the present invention.

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106). For further explanation, FIG. 3A sets forth a block diagram of an example Point-To-Point Adapter (180) useful in systems capable of collectively loading an application in a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
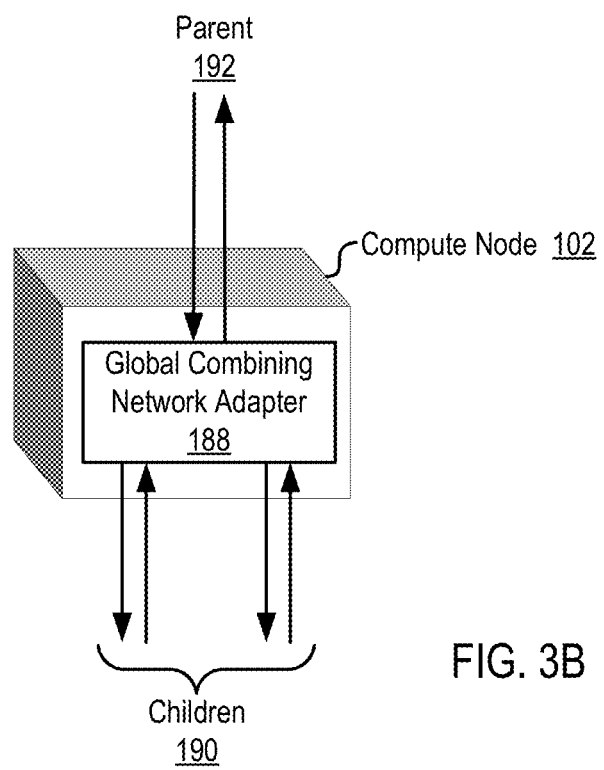
FIG. 3B sets forth a block diagram of an example Global Combining Network Adapter useful in systems capable of collectively loading an application in a parallel computer according to embodiments of the present invention.

For further explanation, FIG. 3B sets forth a block diagram of an example Global Combining Network Adapter (188) useful in systems capable of collectively loading an application in a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
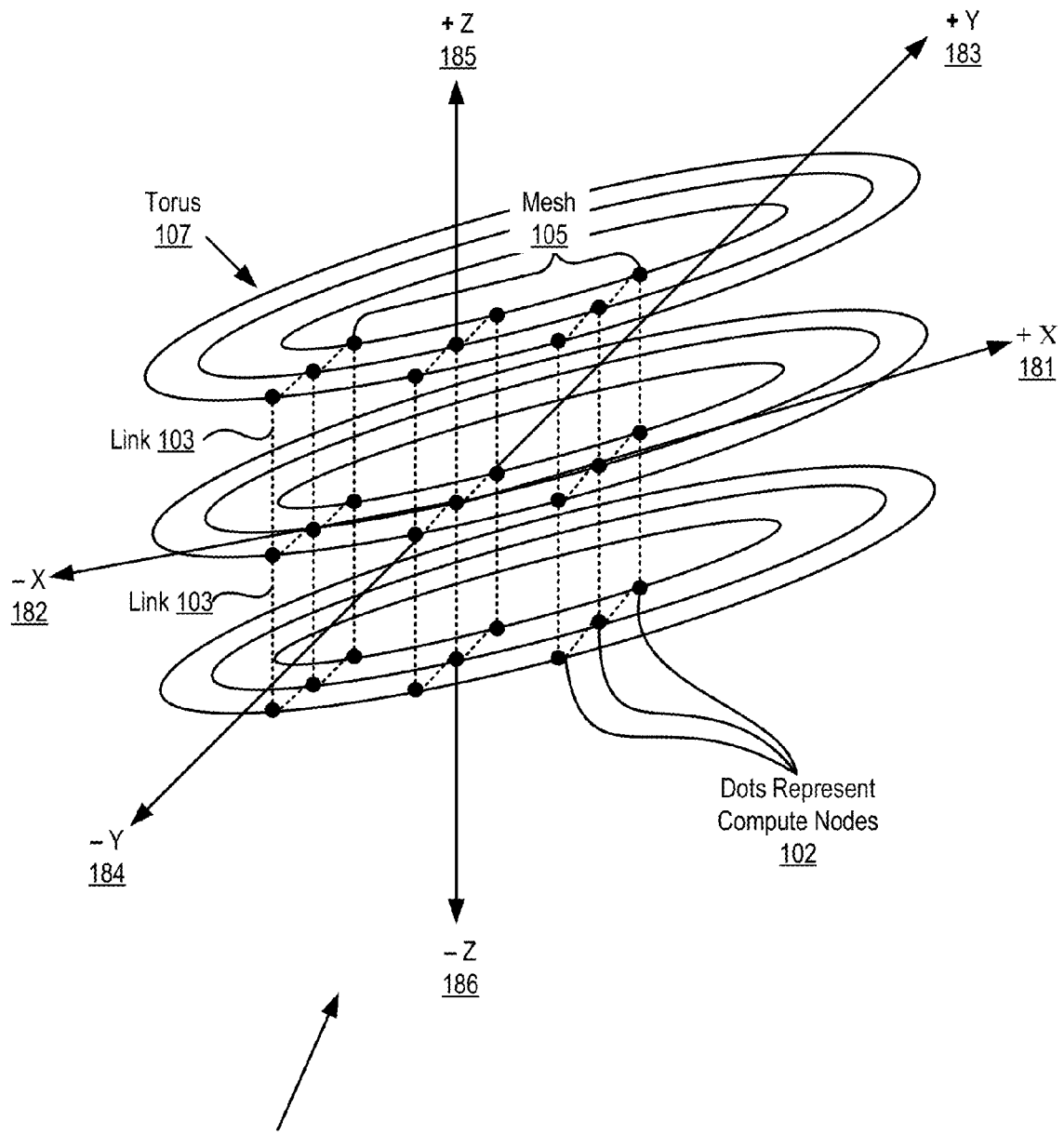
FIG. 4 sets forth a line drawing illustrating an example data communications network optimized for point-to-point operations useful in systems capable of collectively loading an application in a parallel computer according to embodiments of the present invention.

For further explanation, FIG. 4 sets forth a line drawing illustrating an example data communications network (108) optimized for point-to-point operations useful in systems capable of collectively loading an application in a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in collectively loading an application in a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in collectively loading an application in a parallel computer in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 5:
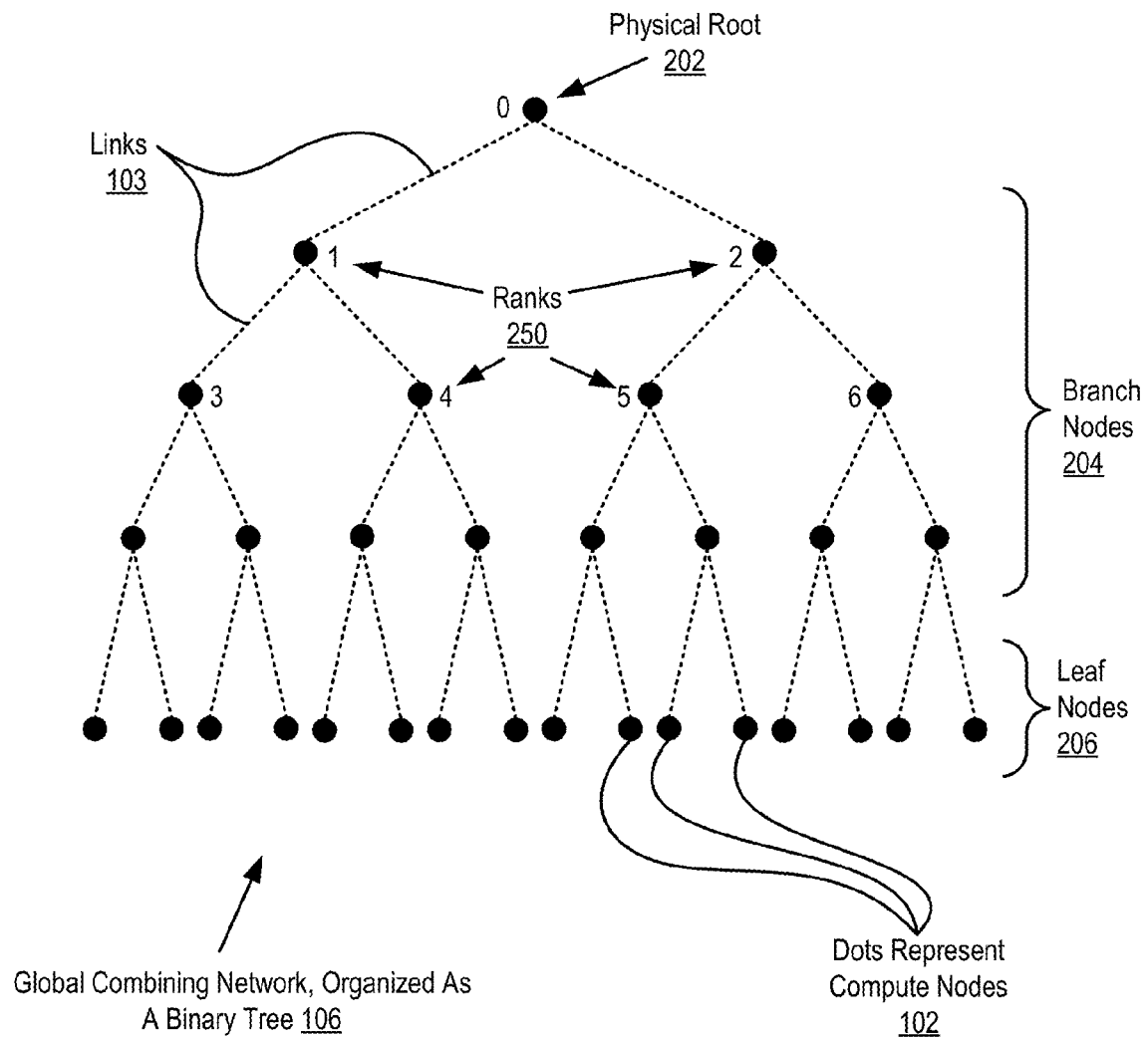
FIG. 5 sets forth a line drawing illustrating an example global combining network useful in systems capable of collectively loading an application in a parallel computer according to embodiments of the present invention.

For further explanation, FIG. 5 sets forth a line drawing illustrating an example global combining network (106) useful in systems capable of collectively loading an application in a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in collectively loading an application in a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
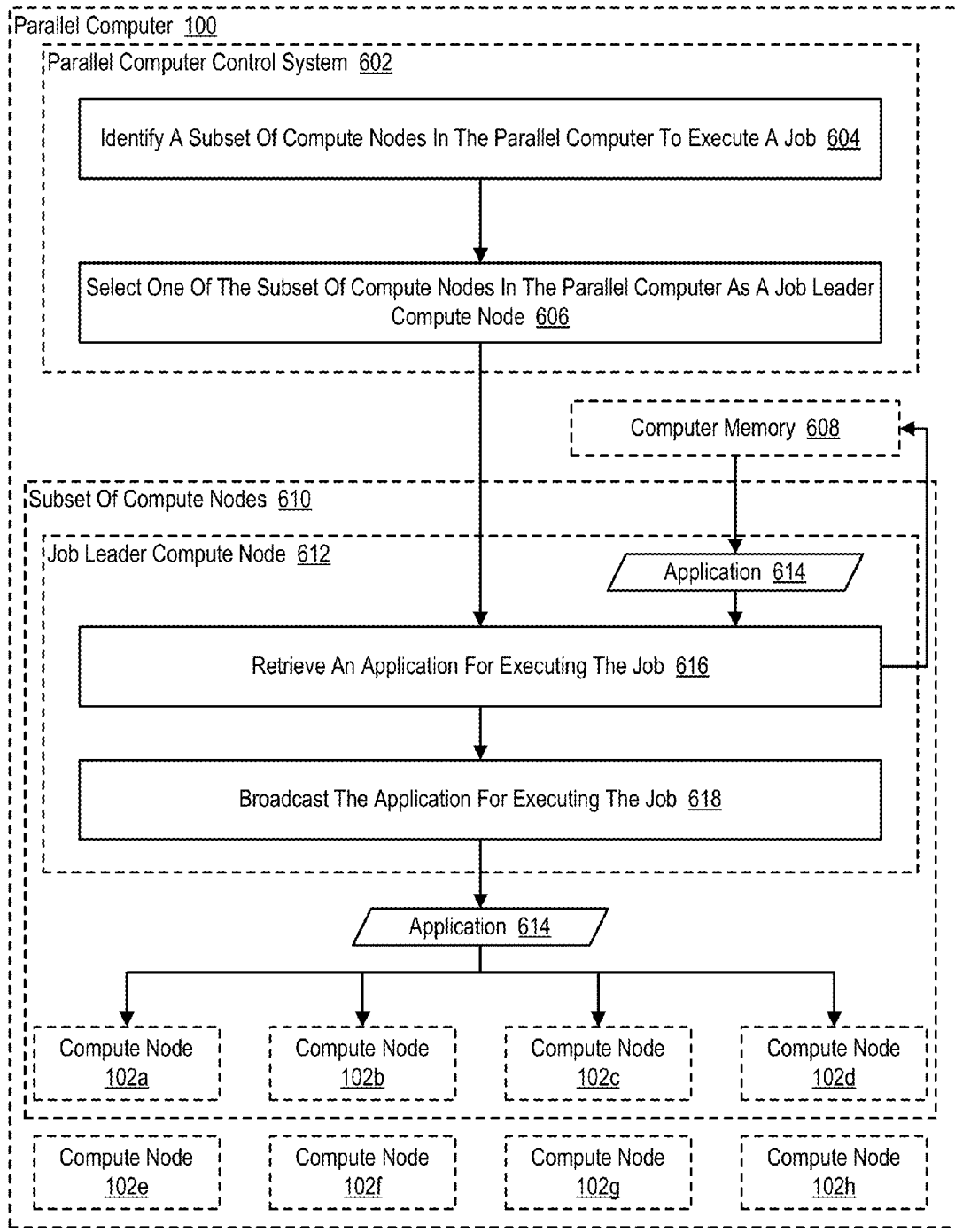
FIG. 6 sets forth a flow chart illustrating an example method for collectively loading an application in a parallel computer according to embodiments of the present invention.

For further explanation, FIG. 6 sets forth a flow chart illustrating an example method for collectively loading an application (614) in a parallel computer (100). In the example method of FIG. 6, an application (614) is 'collectively loaded' into compute nodes of the parallel computer (100) through the use of collective operations and data communications networks between compute nodes of the parallel computer (100) as described above with reference to FIG. 1-5. The parallel computer (100) of FIG. 6 includes a plurality of compute nodes (102a, 102b, 102c, 102d, 102e, 102f, 102g, 102h) as described above with reference to FIG. 1 and FIG. 2.

The example method of FIG. 6 includes identifying (604), by a parallel computer control system (602), a subset of compute nodes (610) in the parallel computer (100) to execute a data processing job. The parallel computer control system (602) of FIG. 6 may be embodied, for example, as a module of computer program instructions configured to manage the execution of data processing jobs in a parallel computer (100). The parallel computer control system (602) of FIG. 6 may be configured to assign data processing jobs to one or more compute nodes (102a, 102b, 102c, 102d, 102e, 102f, 102g, 102h) in the parallel computer (100), send configuration information to the compute nodes (102a, 102b, 102c, 102d, 102e, 102f, 102g, 102h) in the parallel computer (100) that are assigned to execute the data processing job, receive results from the compute nodes (102a, 102b, 102c, 102d, 102e, 102f, 102g, 102h) in the parallel computer (100) that are assigned to execute a data processing job, and so on.

In the example method of FIG. 6, identifying (604), by a parallel computer control system (602), a subset of compute nodes (610) in the parallel computer (100) to execute the data processing job may be carried out, for example, by identifying compute nodes in the parallel computer (100) that are underutilized, by identifying the least utilized compute nodes in the parallel computer (100), by determining the number of compute nodes needed to execute a data processing job, by identifying compute nodes with the requisite types of computer resources needed to execute a data processing job, and so on. The example method of FIG. 6 depicts five compute nodes (102a, 102b, 102c, 102d, 612) that are identified (604) as being part of the subset of compute nodes (610) in the parallel computer (100) to execute a data processing job. The remaining compute nodes (102e, 102f, 102g, 102h) in the parallel computer are not included in the subset of compute nodes (610) in the parallel computer (100) to execute a data processing job.

The example method of FIG. 6 also includes selecting (606), by the parallel computer control system (602), one compute node in the subset of compute nodes (610) in the parallel computer (100) as a job leader compute node (612). In the example method of FIG. 6, the job leader compute node (612) is one of the compute nodes in the selected subset of compute nodes (610) in the parallel computer (100). The job leader compute node (612) operates somewhat differently than the other compute nodes (102a, 102b, 102c, 102d) in the selected subset of compute nodes (610) as the job leader compute node (612) is responsible for carrying out administrative aspects of executing the data processing job. For example, the job leader compute node (612) may be responsible for retrieving a job processing software application from memory in the parallel computer (100), sending the job processing software application other compute nodes (102a, 102b, 102c, 102d) in the selected subset of compute nodes (610), sending necessary configuration information to the compute nodes (102a, 102b, 102c, 102d) in the selected subset of compute nodes (610), and so on.

In the example method of FIG. 6, selecting (606) one compute node in the subset of compute nodes (610) in the parallel computer (100) as a job leader compute node (612) may be carried out in many ways as will occur to those of skill in the art. For example, selecting (606) one compute node in the subset of compute nodes (610) in the parallel computer (100) as a job leader compute node (612) may be carried out by randomly selecting one compute node in the subset of compute nodes (610) in the parallel computer (100) as a job leader compute node (612), by using a selection algorithm that selects a compute node that has most recently been selected as a job leader compute node (612), by using a selection algorithm that selects a compute node that has least recently been selected as a job leader compute node (612), and so on. In addition, selecting (606) one compute node in the subset of compute nodes (610) in the parallel computer (100) as a job leader compute node (612) may be carried out by identifying the compute node in the subset of compute nodes (610) in the parallel computer (100) that has the highest amount of available network bandwidth, by identifying a compute node that has the fewest number of average network hops between itself and the other compute nodes (102a, 102b, 102c, 102d) in the subset of compute nodes (610) in the parallel computer (100), and so on.

The example method of FIG. 6 also includes retrieving (616), by the job leader compute node (612) from computer memory (608), an application (614) for executing the data processing job. In the example method of FIG. 6, the application (614) may be embodied as a special purpose module of computer program instructions for carrying out a specific task. Consider an example in which the data processing job is an instruction to sort entries in a database. In such an example, the application (614) may be embodied as a sorting algorithm that inspects the contents of a database and sorts entries in the database using a designated field in each database entry. The application (614) for executing the data processing job may be embodied, for example, as a file that includes computer program instructions that, when installed on a particular compute node, enables the compute node to sort entries in a database.

In the example method of FIG. 6, retrieving (616), by the job leader compute node (612) from computer memory (608), an application (614) for executing the data processing job may be carried out by issuing an instruction to read a location in computer memory (608) at which the application (614) is stored. Readers will appreciate that because the job leader compute node (612) is the only compute node in the subset of compute nodes (610) that performs a read operation from computer memory (608), the computer memory (608) will not be overburdened with read requests. Consider an example in which the subset of compute nodes (610) consisted of tens of thousands of compute nodes. In such an example, if each compute node in the subset of compute nodes (610) were to individually attempt to acquire the application (614), the computer memory (608) and corresponding memory controllers would need to service tens of thousands of read requests. In embodiments of the present invention, however, the computer memory (608) and corresponding memory controllers only need to service one read request, which is issued by the job leader compute node (612).

In the example method of FIG. 6, readers will appreciate that in some embodiments the application (614) may not necessarily reside in the computer memory (608) when the job leader compute node (612) initially attempts to retrieve (616) the application (614). In such an example, the job leader compute node (612) may issue a request to read the application (614) from a network location and may subsequently store the application (614) in the computer memory (608).

The example method of FIG. 6 also includes broadcasting (618), by the job leader compute node (612) to the subset of compute nodes (610) in the parallel computer (100), the application (614) for executing the data processing job. Broadcasting (618) the application (614) for executing the data processing job may be carried out, for example, through the use of a collective broadcast operation as described above with reference to FIGS. 1-5. In such an example, the job leader compute node (612) may broadcast the application (614) to other compute nodes (102a, 102b, 102c, 102d) in the subset of compute nodes (610) in the parallel computer (100) and wait for a response from each compute node (102a, 102b, 102c, 102d) indicating that the application (614) was received. Readers will appreciate that the job leader compute node (612) may even write the application (614) directly into computer memory on a particular compute node (102a, 102b, 102c, 102d) through the use of a direct put operation.

Figure 7:
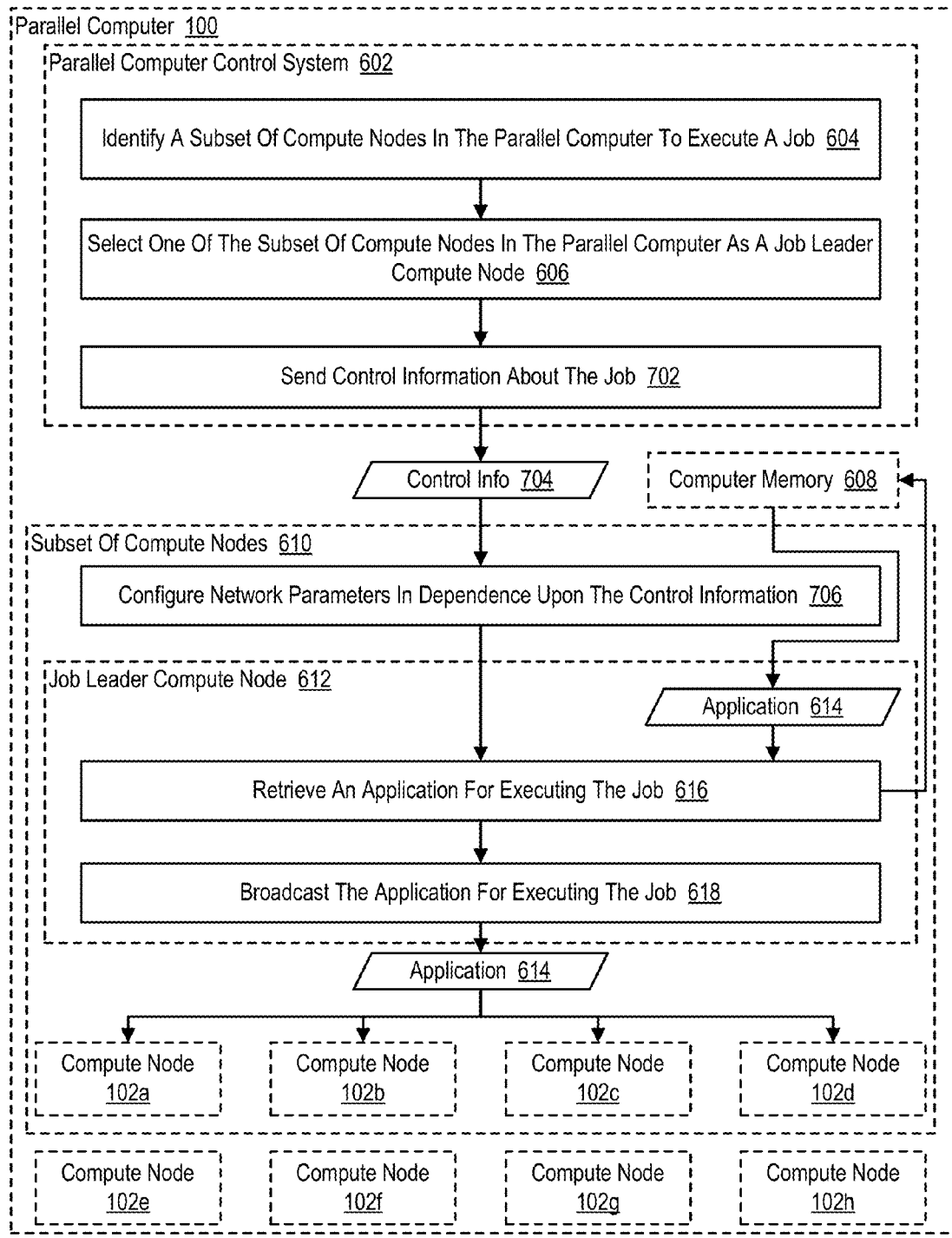
FIG. 7 sets forth a flow chart illustrating an example method for collectively loading an application in a parallel computer according to embodiments of the present invention.

For further explanation, FIG. 7 sets forth a flow chart illustrating an example method for collectively loading an application (614) in a parallel computer (100). The example method of FIG. 7 is similar to the example method of FIG. 6, as it also includes, identifying (604) a subset of compute nodes (610) in the parallel computer (100) to execute a data processing job, selecting (606) one compute node in the subset of compute nodes (610) in the parallel computer (100) as a job leader compute node (612), retrieving (616) an application (614) for executing the data processing job, and broadcasting (618) the application (614) for executing the data processing job to the subset of compute nodes (610) in the parallel computer (100).

The example method of FIG. 7 also includes sending (702), from the parallel computer control system (602) to the subset of compute nodes (610) in the parallel computer (100), control information (704) about the data processing job. In the example method of FIG. 7, the control information (704) about the data processing job can include, for example, input parameters to be used when executing the data processing job, an identification of other compute nodes in the subset of compute nodes (610) in the parallel computer (100) that will also be executing the data processing job, information used to configure data communications networks between compute nodes in the subset of compute nodes (610) in the parallel computer (100), and so on.

The example method of FIG. 7 also includes configuring (706), by each compute node (102a, 102b, 102c, 102d, 612) in the subset of compute nodes (610) in the parallel computer (100), network parameters in dependence upon the control information (704). Consider an example in which the compute nodes (102a, 102b, 102c, 102d, 612) in the subset of compute nodes (610) are connected via a torus network as described above with reference to FIGS. 1-5. In such an example, a particular compute node (102a) may be connected, directly or indirectly, to other compute nodes (102b, 102c, 102d, 612) in the subset of compute nodes (610) over one or more ports in the particular compute node (102a). As such, the control information (704) may specify a particular path through the subset of compute nodes (610) that a particular message, such as a message containing the application (614), should be passed.

In order to facilitate the proper routing of messages, the control information (704) may include information identifying an ingress port and an egress port for a particular message type for each compute node (102a, 102b, 102c, 102d, 612) in the subset of compute nodes (610). Consider an example in which a message of a particular type should be received by compute node (102b), sent from compute node (102b) to compute node (102a), and subsequently sent to compute node (102c) by compute node (102a). In such an example the control information (704) may indicate that a compute node (102a) should receive messages from compute node (102b) over a first port in compute node (102a). The control information (704) may also indicate that the compute node (102a) should send any received messages to compute node (102c) over a second port in compute node (102a). In such an example, configuring (706) network parameters in dependence upon the control information (704) could be carried out by configuring a first port in compute node (102a) that is connected to compute node (102b) to receive messages. Configuring (706) network parameters in dependence upon the control information (704) could further be carried out by configuring a second port in compute node (102a) that is connected to compute node (102c) to send messages.

Figure 8:
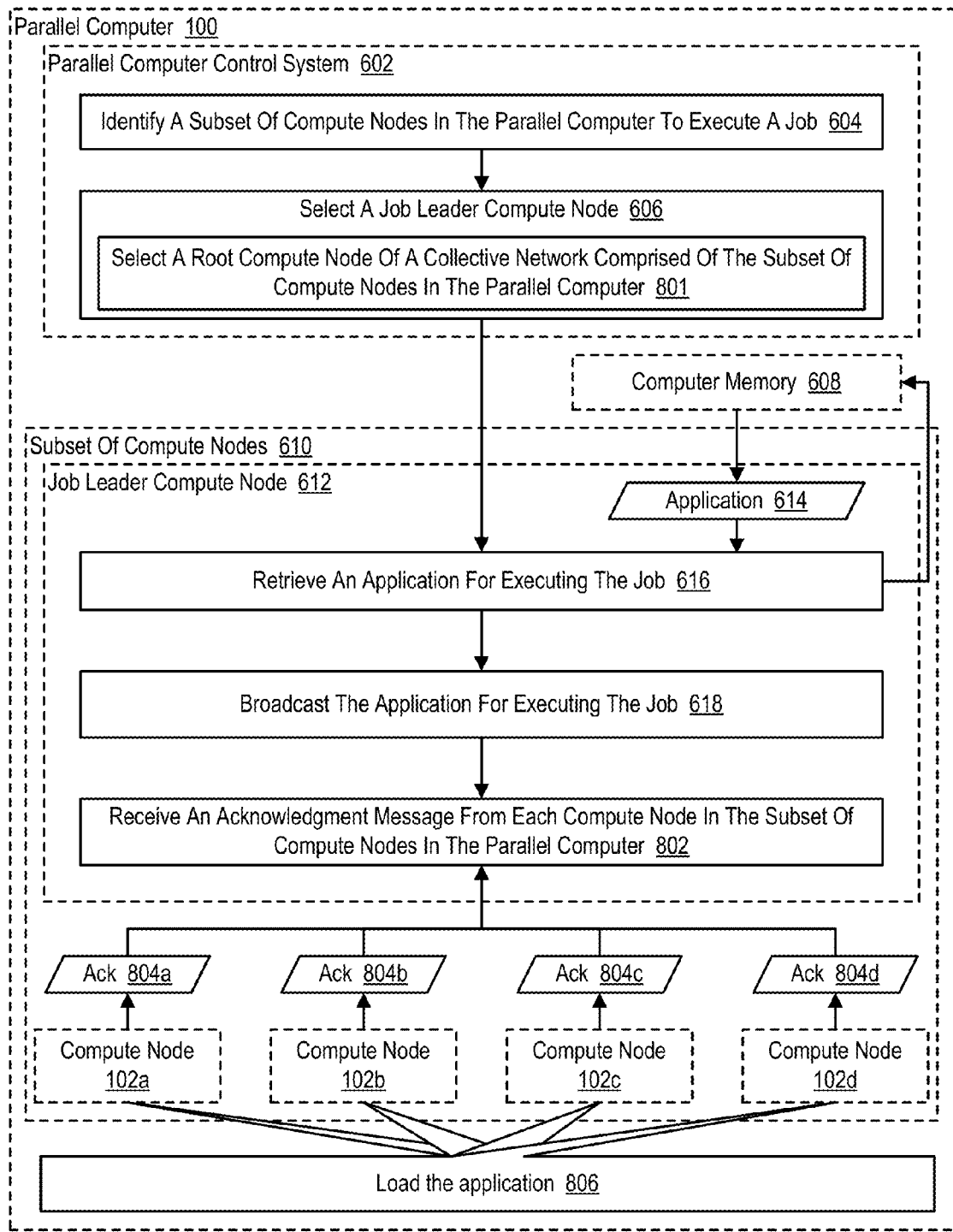
FIG. 8 sets forth a flow chart illustrating an example method for collectively loading an application in a parallel computer according to embodiments of the present invention.

For further explanation, FIG. 8 sets forth a flow chart illustrating an example method for collectively loading an application (614) in a parallel computer (100). The example method of FIG. 8 is similar to the example method of FIG. 6, as it also includes, identifying (604) a subset of compute nodes (610) in the parallel computer (100) to execute a data processing job, selecting (606) one compute node in the subset of compute nodes (610) in the parallel computer (100) as a job leader compute node (612), retrieving (616) an application (614) for executing the data processing job, and broadcasting (618) the application (614) for executing the data processing job to the subset of compute nodes (610) in the parallel computer (100). In the example method of FIG. 8, selecting (606) one compute node in the subset of compute nodes (610) in the parallel computer (100) as a job leader compute node (612) can include selecting (801) a root compute node of a collective network comprised of the subset of compute nodes (610) in the parallel computer (100). Consider an example in which the subset of compute nodes (610) in the parallel computer (100) are connected over a data communications network as follows: compute node (612) is connected to compute node (102a) and compute node (102b); compute node (102a) is connected to compute node (102c) and compute node (612); compute node (102b) is connected to compute node (102d) and compute node (612); compute node (102c) is connected to compute node (102e) and compute node (102a); and compute node (102d) is connected to compute node (102f) and compute node (102b). In such an example, the subset of compute nodes (610) in the parallel computer (100) can be organized into a tree as follows: compute node (612) is the parent of compute node (102a) and compute node (102b); compute node (102a) is the parent of compute node (102c); and compute node (102b) is the parent of compute node (102e). In such an example, selecting (801) a root compute node of a collective network comprised of the subset of compute nodes (610) in the parallel computer (100) would result in selecting (606) compute node (612) as the job leader compute node (612).

The example method of FIG. 8 also includes receiving (802), by the job leader compute node (612), an acknowledgment message (804a, 804b, 804c, 804d) from all other compute nodes (102a, 102b, 102c, 102d) in the subset of compute nodes (610) in the parallel computer (100). In the example method of FIG. 8, each acknowledgment message (804a, 804b, 804c, 804d) specifies that the application (614) has been received by the sender of the acknowledgment message (804a, 804b, 804c, 804d). Each acknowledgment message (804a, 804b, 804c, 804d) in the example method of FIG. 8 may include verification data, such as a checksum, that may be by the job leader compute node (612) to verify that the application (614) has been correctly received by the sender of the acknowledgment message (804a, 804b, 804c, 804d) without error.

The example method of FIG. 8 also includes loading (806), by each compute node (102a, 102b, 102c, 102d, 612) in the subset of compute nodes (610) in the parallel computer (100), the application (614). In the example method of FIG. 8, loading (806) the application (614) may include storing the application (614) at a location in memory on each compute node (102a, 102b, 102c, 102d, 612) that is specified in the control information (704), storing environment variables and execution parameters at a location in memory on each compute node (102a, 102b, 102c, 102d, 612) that is specified in the control information (704), and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of collectively loading an application in a parallel computer, the parallel computer comprising a plurality of compute nodes, the method comprising steps of:

identifying, by a parallel computer control system, a subset of compute nodes in the parallel computer to execute a data processing job;

selecting, by the parallel computer control system, one compute node in the subset of compute nodes in the parallel computer as a job leader compute node;

retrieving, an application for executing the data processing job from a computer memory in the parallel computer and loading into a memory of the job leader node;

performing, by the subset of compute nodes, a collective broadcast operation, including broadcasting, by the job leader compute node to the subset of compute nodes in the parallel computer, the application for executing the data processing job; and sending, from the parallel computer control system to the subset of compute nodes in the parallel computer, control information about the data processing job, wherein the control information comprises a particular path through the subset of compute nodes that messages should be passed, wherein the particular path is based on a message type.

2. The method of claim 1 further comprising configuring, by each compute node in the subset of compute nodes in the parallel computer, network parameters in dependence upon the control information.

3. The method of claim 1 wherein selecting one of the subset of compute nodes in the parallel computer as a job leader compute node further comprises selecting a root compute node of a collective network comprised of the subset of compute nodes in the parallel computer.

4. The method of claim 1 further comprising receiving, by the job leader compute node, an acknowledgment message from each compute node in the subset of compute nodes in the parallel computer, wherein the acknowledgment message specifies that the application has been received by the sender of the acknowledgment message.

5. The method of claim 1 further comprising loading, by each compute node in the subset of compute nodes in the parallel computer, the application.

6. An apparatus for collectively loading an application in a parallel computer, the parallel computer comprising a plurality of compute nodes, the apparatus comprising a computer processor, a computer memory operatively coupled to the computer processor, the computer memory having disposed within it computer program instructions that, when executed by the computer processor, cause the apparatus to carry out the steps of:

identifying, by a parallel computer control system, a subset of compute nodes in the parallel computer to execute a data processing job;

selecting, by the parallel computer control system, one compute node in the subset of compute nodes in the parallel computer as a job leader compute node;

retrieving, an application for executing the data processing job from a computer memory in the parallel computer and loading into a memory of the job leader node;

performing, by the subset of compute nodes, a collective broadcast operation, including broadcasting, by the job leader compute node to the subset of compute nodes in the parallel computer, the application for executing the data processing job; and sending, from the parallel computer control system to the subset of compute nodes in the parallel computer, control information about the data processing job, wherein the control information comprises a particular path through the subset of compute nodes that messages should be passed, wherein the particular path is based on a message type.

7. The apparatus of claim 6 further comprising computer program instructions that, when executed by the computer processor, cause the apparatus to carry out the step of configuring, by each compute node in the subset of compute nodes in the parallel computer, network parameters in dependence upon the control information.

8. The apparatus of claim 6 wherein selecting one of the subset of compute nodes in the parallel computer as a job leader compute node further comprises selecting a root compute node of a collective network comprised of the subset of compute nodes in the parallel computer.

9. The apparatus of claim 6 further comprising computer program instructions that, when executed by the computer processor, cause the apparatus to carry out the step of receiving, by the job leader compute node, an acknowledgment message from each compute node in the subset of compute nodes in the parallel computer, wherein the acknowledgment message specifies that the application has been received by the sender of the acknowledgment message.

10. The apparatus of claim 6 further comprising computer program instructions that, when executed by the computer processor, cause the apparatus to carry out the step of loading, by each compute node in the subset of compute nodes in the parallel computer, the application.

11. A computer program product for loading an application in a parallel computer, the parallel computer comprising a plurality of compute nodes, the computer program product disposed upon a non-transitory computer readable medium, the computer program product comprising computer program instructions that, when executed, cause a computer to carry out the steps of:
    identifying, by a parallel computer control system, a subset of compute nodes in the parallel computer to execute a data processing job;
    selecting, by the parallel computer control system, one compute node in the subset of compute nodes in the parallel computer as a job leader compute node;
    retrieving, an application for executing the data processing job from a computer memory in the parallel computer and loading into a memory of the job leader node;
    performing, by the subset of compute nodes, a collective broadcast operation, including broadcasting, by the job leader compute node to the subset of compute nodes in the parallel computer, the application for executing the data processing job; and
    sending, from the parallel computer control system to the subset of compute nodes in the parallel computer, control information about the data processing job, wherein the control information comprises a particular path through the subset of compute nodes that messages should be passed, wherein the particular path is based on a message type.

12. The computer program product of claim 11 further comprising computer program instructions that, when executed, cause a computer to carry out the step of configuring, by each compute node in the subset of compute nodes in the parallel computer, network parameters in dependence upon the control information.

13. The computer program product of claim 11 wherein selecting one of the subset of compute nodes in the parallel computer as a job leader compute node further comprises selecting a root compute node of a collective network comprised of the subset of compute nodes in the parallel computer.

14. The computer program product of claim 11 further comprising computer program instructions that, when executed, cause a computer to carry out the step of receiving, by the job leader compute node, an acknowledgment message from each compute node in the subset of compute nodes in the parallel computer, wherein the acknowledgment message specifies that the application has been received by the sender of the acknowledgment message.

15. The computer program product of claim 11 further comprising computer program instructions that, when executed, cause a computer to carry out the step of loading, by each compute node in the subset of compute nodes in the parallel computer, the application.

* * * * *